(12) United States Patent
Tokumochi

(10) Patent No.: US 11,474,528 B2
(45) Date of Patent: Oct. 18, 2022

(54) BEHAVIOR CONTROL METHOD AND BEHAVIOR CONTROL APPARATUS

(71) Applicant: DENSO CORPORATION, Kariya (JP)

(72) Inventor: Daisuke Tokumochi, Kariya (JP)

(73) Assignee: DENSO CORPORATION, Kariya (JP)

(*) Notice: Subject to any disclaimer, the term of this patent is extended or adjusted under 35 U.S.C. 154(b) by 275 days.

(21) Appl. No.: 16/788,591

(22) Filed: Feb. 12, 2020

(65) Prior Publication Data

US 2020/0264622 A1  Aug. 20, 2020

(30) Foreign Application Priority Data

Feb. 15, 2019  (JP) .............................. JP2019-025721

(51) Int. Cl.
*G05D 1/02* (2020.01)
*B60Q 1/50* (2006.01)

(52) U.S. Cl.
CPC ........... *G05D 1/0219* (2013.01); *B60Q 1/525* (2013.01); *G05D 1/0221* (2013.01); *G05D 1/0285* (2013.01)

(58) Field of Classification Search
CPC .. G05D 1/0219; G05D 1/0221; G05D 1/0285; B60Q 1/525
See application file for complete search history.

(56) References Cited

U.S. PATENT DOCUMENTS

| 2017/0084174 | A1* | 3/2017 | Suzuki | ................. B60W 30/00 |
| 2017/0327094 | A1 | 11/2017 | Inoue et al. | |
| 2020/0406747 | A1* | 12/2020 | Sakai | .................... G08G 1/167 |

FOREIGN PATENT DOCUMENTS

| JP | H9-282592 A | | 10/1997 |
| JP | 2011-194979 A | | 10/2011 |
| JP | 2012-089084 A | | 5/2012 |
| JP | 2016053755 A | * | 4/2016 |
| JP | 2016-122308 A | | 7/2016 |

OTHER PUBLICATIONS

English Translation of JP2011194979A.*
English Translation of JP-2016053755-A.*

* cited by examiner

*Primary Examiner* — Rami Khatib
*Assistant Examiner* — Shahira Baajour
(74) *Attorney, Agent, or Firm* — Maschoff Brennan

(57) ABSTRACT

A behavior control method for controlling a behavior of a vehicle comprising: specifying a blind-spot region as blind-spot of an environment recognition portion along a travel route for the vehicle; determining a jump-out possibility of a moving object to the travel route from the blind-spot region; performing a possibility reduction behavior to lower the jump-out possibility, in response to that the jump-out possibility is confirmed; and performing a travel behavior compliant with the travel route after starting the possibility reduction behavior.

13 Claims, 13 Drawing Sheets

BEHAVIOR CONTROL METHOD AND BEHAVIOR CONTROL APPARATUS

CROSS REFERENCE TO RELATED APPLICATIONS

This application is based on Japanese Patent Application No. 2019-25721 filed on Feb. 15, 2019, the disclosure of which is incorporated herein by reference.

TECHNICAL FIELD

The present disclosure relates to a behavior control technology that controls vehicle behaviors.

BACKGROUND

A related art describes a drive assist device including a blind-spot detection means and a control operation means that operates the safe driving assist control based on a detection result from the blind-spot detection means.

SUMMARY

The present disclosure may describe a behavior control method for controlling a behavior of a vehicle comprising: specifying a blind-spot region; determining a jump-out possibility of a moving object to the travel route from the blind-spot region; performing a possibility reduction behavior; and performing a travel behavior compliant with the travel route.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
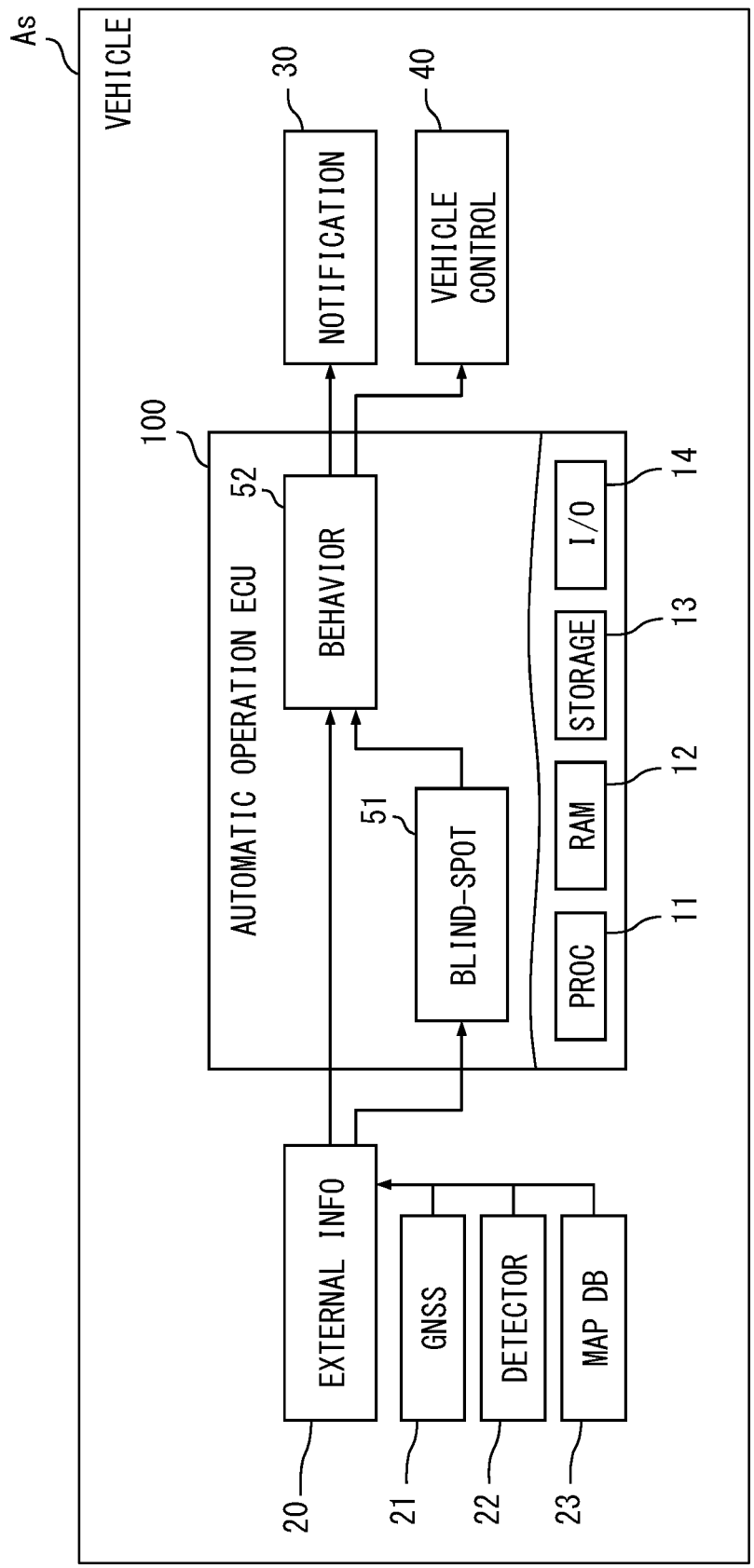
FIG. 1 a block diagram illustrating an overall system of a vehicle including an automatic operation ECU according to an embodiment of the present disclosure.

A related art describes a drive assist device including a blind-spot detection means and a control operation means that operates the safe driving assist control based on a detection result from the blind-spot detection means. The blind-spot detection means detects a blind spot from a vehicle based on the recognition from a surrounding environment recognition means. When there is an area as a blind spot, the drive assist device provides the safe driving assist control by decelerating a subject vehicle down to a speed capable of responding to a moving object jumping out of a blind spot.

The travel route of a subject vehicle may intersect with the other lane when the subject vehicle turns right or left at an intersection or changes the lane on a road including a plurality of lanes. In such a situation, an area as a blind spot may easily occur on the travel route and a moving object may tend to be highly likely to jump out of a blind-spot region to the travel route. The control to simply decelerate the subject vehicle may keep a jump-out possibility to be high. When a blind-spot region exists, it may be difficult for the subject vehicle to maintain travel behavior such as turn or lane change.

The present disclosure describes a behavior control method and a behavior control apparatus capable of allowing a vehicle to maintain the travel behavior compliant with the travel route including turn or lane change on a travel route even when a blind-spot region exists.

According to one aspect of the present disclosure, a behavior control method for controlling a behavior of a vehicle may be provided. The behavior control method is performed by at least one processor. The behavior control method may comprise: specifying a blind-spot region as blind-spot of an environment recognition portion along a travel route for the vehicle, the environment recognition portion being mounted on the vehicle and recognizing a travel environment; determining a jump-out possibility of a moving object to the travel route from the blind-spot region; performing a possibility reduction behavior to lower the jump-out possibility, in response to that the jump-out possibility is confirmed; and performing a travel behavior compliant with the travel route after starting the possibility reduction behavior.

According to another aspect of the present disclosure, a behavior control apparatus controlling a behavior of a vehicle mounted with an environment recognition portion that recognizes a travel environment may be provided. The behavior control apparatus may comprise: a blind-spot determination section that is configured to specify a blind-spot region as a blind spot for the environment recognition portion along a travel route for the vehicle configured to include at least one of a turn or a lane change, and determine a jump-out possibility of a moving object to the travel route from the blind-spot region; and a behavior determination section that is configured to start a possibility reduction behavior before the vehicle performs the travel behavior compliant with the travel route, the jump-out possibility from the blind-spot region being lowered through the possibility reduction behavior.

According to these aspects, the possibility reduction behavior is performed before the travel behavior in a case where the travel route includes a blind-spot region for the environment recognition portion and also there is a jump-out possibility of a moving object from the blind-spot region. The possibility reduction behavior is performed to enable the vehicle to start the travel behavior under the condition that there is a lowered jump-out possibility of the moving object jumping out of the blind-spot region to the travel route. Consequently, the vehicle can continue the travel behavior compliant with the travel route even when a blind-spot region exits in the travel route including turn or a lane change.

As illustrated in FIG. 1, an automatic operation ECU (Electronic Control Unit) 100 according to an embodiment of the present disclosure represents an arithmetic processing device that is used for a vehicle As and provides the vehicle As with autonomous travel. The automatic operation ECU 100 is mounted on the vehicle As along with an external information recognition device 20 and a vehicle control device 40 and interacts with the devices 20 and 40 to control the behavior of the vehicle As in place of a driver. The automatic operation ECU 100 electrically connects directly or indirectly with an exterior notification device 30, for example, in addition to the external information recognition device 20 and the vehicle control device 40 described above. The automatic operation ECU 100, the external information recognition device 20, the vehicle control device 40, and the exterior notification device 30 are mutually capable of communication.

The external information recognition device 20 represents an arithmetic processing device that recognizes a travel environment around the vehicle As. The external information recognition device 20 mainly includes a microcomputer comprised of a processor, RAM, a storage portion, an input/output interface, a bus connecting these components, or the like. The external information recognition device 20 electrically connects directly or indirectly with an onboard configuration such as a GNSS (Global Navigation Satellite System) receiver 21, an object detector 22, and a high-precision map database (referred to as a "map DB") 23.

The GNSS receiver 21 receives positioning signals transmitted from a plurality of artificial satellites (positioning satellites). The GNSS receiver 21 can receive positioning signals from artificial satellites for at least one of satellite positioning systems such as GPS, GLONASS, Galileo, IRNSS, QZSS, and BeiDou. The GNSS receiver 21 provides the external information recognition device 20 with the received positioning signal as subject vehicle position information representing the current position of the vehicle As.

The object detector 22 represents an autonomous sensor that monitors a surrounding environment of the vehicle As. The object detector 22 can detect a moving object and a motionless object from a detection range around the subject vehicle. The moving object includes a pedestrian, a cyclist, any animal other than a human being, and a different vehicle, for example. The motionless object includes a fallen object on road, a guardrail, a curbstone, road markings such as a lane line, and a structural object at the side of a road, for example. The object detector 22 provides the external information recognition device 20 with detection information resulting from detecting objects around the vehicle As.

The object detector 22 includes a front camera, a lidar (may be referred to as a LIDAR), and a millimeter-wave radar as specific detection configurations to detect objects. The front camera outputs detection information using at least one of captured data resulting from capturing a forward range of the vehicle As and a result of analyzing the captured data. The lidar irradiates a laser beam to the forward range, performs a process to receive reflected light reflecting off the moving object and the motionless object, and generates the detection information about the forward range. The millimeter-wave radar irradiates a millimeter wave or a submillimeter wave to the forward range, performs a process to receive reflected light reflecting off the moving object and the motionless object, and generates the detection information about the forward range. The object detector 22 may include a detection configuration such as a sonar. The front camera may represent a monocular camera or a multi-lens camera using two, three, or more lenses.

The map DB 23 is mainly configured as non-volatile memory and stores highly accurate map data (may also be described as "high-precision map data") prepared for automatic operation. The high-precision map data contains three-dimensional shape information about roads including intersections, lane count information, information representing traveling directions permitted to be available for each lane, and construction information such as a crosswalk and a bicycle lane, for example. The map DB 23 provides the external information recognition device 20 with the high-precision map data around the vehicle As based on a request from the external information recognition device 20.

The external information recognition device 20 replicates the current travel environment of the vehicle As in a virtual space mainly based on the subject vehicle position information, the detection information, and the high-precision map data. Specifically, the external information recognition device 20 maps a road shape represented by the high-precision map data to the virtual three-dimensional space, places a subject vehicle model at the position indicated by the subject vehicle position information, and places object models such as a different vehicle, a pedestrian, and a building at relative positions indicated by the detection information. Moreover, the external information recognition device 20 associates a travel route PR (see FIG. 5) with the recognized travel environment based on the user manipulation on an HMI (Human Machine Interface) installed on the vehicle As that is scheduled for autonomous travel along a travel route PR. The external information recognition device 20 successively outputs the recognition result of the travel environment and a travel route PR for the vehicle As to the automatic operation ECU 100.

The vehicle control device 40 represents an arithmetic processing device that controls the travel behavior of the vehicle As in conjunction with the automatic operation ECU 100. The vehicle control device 40 mainly includes a microcomputer comprised of a processor, RAM, a storage portion, an input/output interface, a bus connecting these components, or the like. The vehicle control device 40 electrically connects directly or indirectly with an onboard sensor group and an onboard actuator group mounted on the vehicle As. The onboard sensor group includes a vehicle speed sensor, a steering angle sensor, an accelerator position sensor, and a brake pedal force sensor, for example. The onboard actuator group includes a throttle actuator, an injector, a brake actuator, and a motor generator for driving and regeneration, for example. The vehicle control device 40 provides acceleration/deceleration control, steering control or the like over the vehicle As by performing a process to integrally operate the onboard actuator group based on a behavior request instruction acquired from the automatic operation ECU 100.

The exterior notification device 30 represents an arithmetic processing device that controls the notification behavior of the vehicle As in conjunction with the automatic operation ECU 100. The exterior notification device 30 notifies a notification target around the vehicle of the future travel behavior scheduled for the vehicle As based on the behavior request instruction acquired from the automatic operation ECU 100. The notification target may be limited to a different vehicle (also referred to as the other vehicle) and a pedestrian moving along a travel route PR (see FIGS. 5 and 14) or may include unspecified different vehicles and pedestrians around the vehicle. The exterior notification device 30 includes an exterior communication device and a headlight HL (see FIG. 7), for example.

The exterior communication device represents a communication module mounted on the vehicle As. The exterior communication device includes wireless communication functions such as road-to-vehicle communication, inter-vehicle communication, and pedestrian-to-vehicle communication. The exterior communication device transmits the future behavior such as turns and a lane change scheduled for the vehicle As to an onboard device mounted on a different vehicle and a mobile terminal carried by a pedestrian, for example. When crossing an opposite lane, a crosswalk, or the like, the exterior communication device can previously notify initiation of the travel behavior of the vehicle As mainly to nearby drivers and pedestrians by using wireless communication. Incidentally, the term "turns" may mean a right turn, a left turn, and a combination of them. The term "turns" may include U-turn.

The headlight HL (see FIG. 7) is used as a notification configuration for non-telecommunications notification behavior that notifies surroundings of the future behavior such as turns and a lane change scheduled for the vehicle As by using a means other than wireless communications. The headlight HL performs an operation of headlight flashing to call attention to the travel behavior of the vehicle As. The headlight flashing as a non-telecommunications notification behavior repeatedly alternates a low beam and a high beam more than once or turns on the high beam more than once in synchronization with an operation of turning on or flashing an indicator (turn signal light). The headlight flashing as a non-telecommunications notification behavior may repeatedly alternate a low beam and a high beam more than once or may turn on the high beam more than once, irrespective of an operation of an indicator.

The automatic operation ECU 100 generates a behavior request instruction that determines the behavior of the vehicle As based on the information acquired from the external information recognition device 20 and is output to the exterior notification device 30 and the vehicle control device 40. The automatic operation ECU 100 mainly includes a computer comprised of a processor 11, a RAM 12, a storage portion 13, an input/output interface 14, a bus connecting these components, or the like. The processor 11 provides hardware connected with the RAM 12 for arithmetic processing. The processor 11 performs various processes that access the RAM 12 to provide functions of function portions to be described later. The processor 11 includes at least one of arithmetic processing cores such as a CPU (Central Processing Unit) and a GPU (Graphics Processing Unit). The processor 11 may further include an FPGA (Field-Programmable Gate Array) an IP core provided with other dedicated functions, or the like. The storage portion 13 includes a non-volatile storage medium. The storage portion 13 stores various programs (such as a behavior control program) executed by the processor 11.

Figure 2:
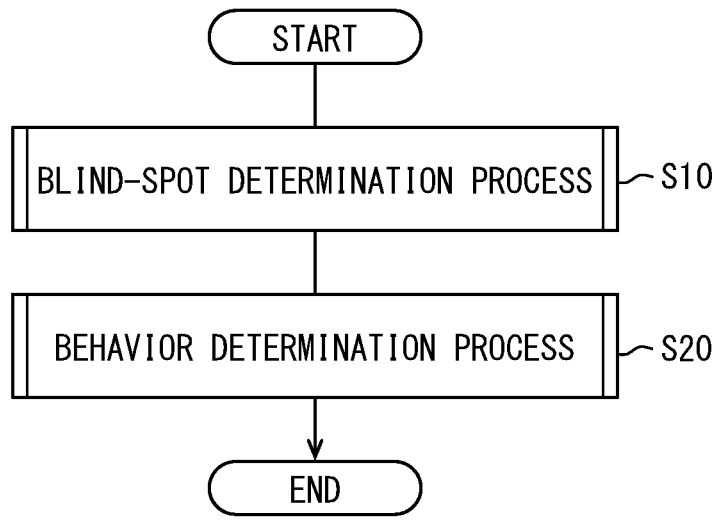
FIG. 2 is a flowchart illustrating the main process of a behavior control process performed by the automatic operation ECU.

The automatic operation ECU 100 provides a plurality of function portions including a blind-spot determination section 51 and a behavior determination section 52 by allowing the processor 11 to execute the programs stored in the storage portion 13. Based on a state of activating an automatic travel function, the automatic operation ECU 100 allows the blind-spot determination section 51 and the behavior determination section 52 to start a behavior control process (see FIG. 2). The automatic operation ECU 100 continuously performs the behavior control process until an autonomous travel function is inactivated, for example.

The blind-spot determination section 51 provides a function portion that performs a blind-spot determination process (see S10 in FIG. 2 and FIG. 3) included in the behavior control process. The blind-spot determination section 51 performs the blind-spot determination process by using a travel environment recognition result acquired from the external information recognition device 20 and a travel route PR for the vehicle As. The blind-spot determination section 51 includes a function to specify a blind-spot region BS (see FIG. 5) and a function to determine a jump-out possibility of a moving object HO (see FIG. 5) from the blind-spot region BS to a travel route PR. Incidentally, the tem "jump out" may be referred to as "jaywalk".

The blind-spot region BS corresponds to part of a recognition range SA (see FIG. 5), enabling the object detector 22 to detect an object and is hidden by a different vehicle or a building, for example. This range disables the external information recognition device 20 to recognize objects. Therefore, the blind-spot region BS provides a spatial range that causes a lack of information in the travel environment recognition result.

Based on the contents of a travel route PR, the blind-spot determination section 51 performs the blind-spot determination process corresponding to the travel behavior performed by the vehicle As. For example, when an intersection and a branch point configure a travel route PR that allows the vehicle As to make turns, the blind-spot determination section 51 performs the blind-spot determination process (see FIG. 3) for a turns scene. In this blind-spot determination process, the blind-spot determination section 51 uses the high-precision map data to determine whether there is a lane or a crosswalk obstructing a travel route PR (see S111 in FIG. 3). If there is no lane or crosswalk obstructing a travel route PR, the blind-spot determination section 51 determines that the blind-spot region BS does not exist.

Figure 3:
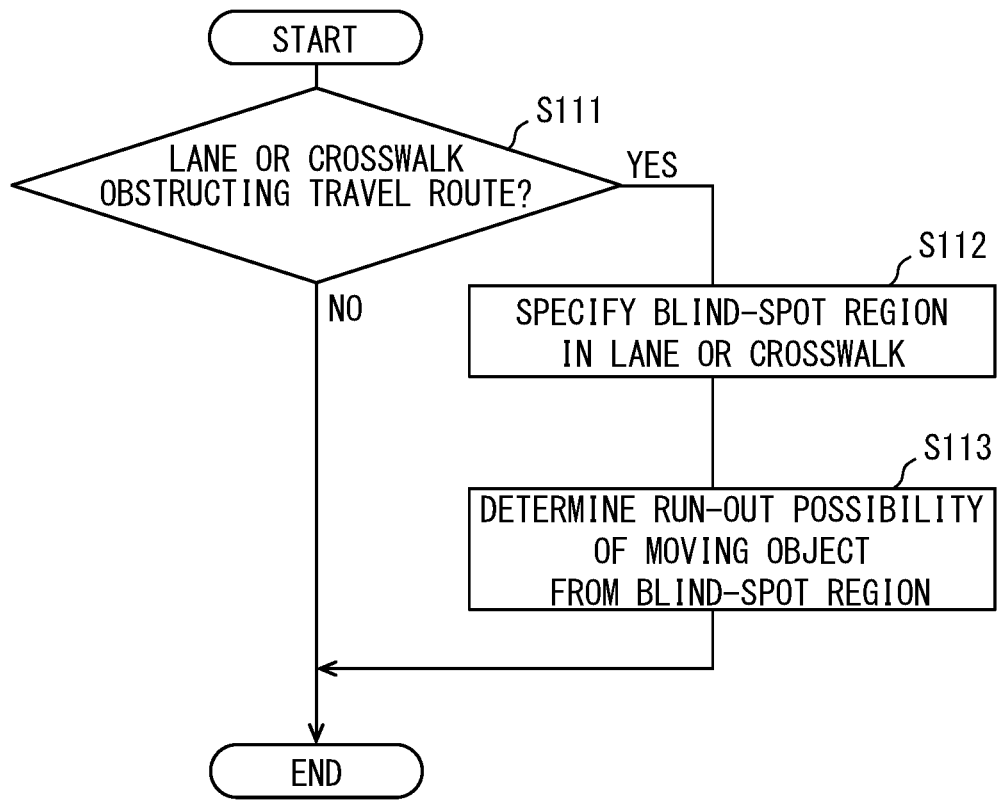
FIG. 3 is a flowchart illustrating details of a blind-spot determination process that constitutes a sub-process of the behavior control process and is performed when a vehicle makes turns.

If a travel route PR is configured to make turns to cross an opposite lane, the blind-spot determination section 51 specifies the blind-spot region BS (see FIG. 5) as a blind spot along a travel route PR for the external information recognition device 20 (see S112 in FIG. 3). Specifically, the blind-spot determination section 51 assigns a priority monitoring range MA (see FIG. 5) to an opposite lane, a crosswalk, or the like, based on the high-precision map data. The priority monitoring range MA corresponds to a spatial range where the existence of the blind-spot region BS affects the current travel route PR. The blind-spot determination section 51 specifies the blind-spot region BS that belongs to the priority monitoring range MA and causes a lack of information in the travel environment recognition result.

When the blind-spot region BS is specified, the blind-spot determination section 51 assumes that the moving object HO (such as a straight oncoming vehicle) exists in the blind-spot region BS. The blind-spot determination section 51 moreover assumes that the moving object HO approaches a travel route PR at a supposed moving speed. The supposed moving speed is set to a limiting speed for the opposite lane or a value higher than the limiting speed by a specified speed such as 10 to 20 km/h. The blind-spot determination section 51 determines a jump-out possibility that the assumed the moving object HO from the blind-spot region BS jumps out to a travel route PR (see S113 in FIG. 3). For example, the blind-spot determination section 51 may determine a possibility that the moving object from the blind-spot region intrudes the travel route from the blind-spot region.

The blind-spot determination section 51 determines a jump-out possibility of the assumed the moving object HO at multiple stages such as three stages. The blind-spot determination section 51 assigns a determination result of "none" to the jump-out possibility when the moving object HO cannot practically jump out of the blind-spot region BS. For example, the blind-spot region BS may be very distant from a travel route PR. The blind-spot region BS may be too small to hide the moving object HO. A vehicle may stop to disable a jump-out possibility from the blind-spot region BS. In these cases, the blind-spot determination section 51 determines the jump-out possibility to be "none."

When the jump-out possibility is not determined to be "none," the blind-spot determination section 51 assumes the jump-out possibility to be existent and assigns a level "low" or "high" to the jump-out possibility. The blind-spot determination section 51 determines the level of a jump-out possibility of the moving object HO from the blind-spot region BS depending on at which rate the blind-spot region BS exists in the priority monitoring range MA. The blind-spot determination section 51 increases the jump-out possibility corresponding to an increase of the blind-spot region BS in the priority monitoring range MA. The blind-spot determination section 51 also increases the jump-out possibility corresponding to an increase of the supposed moving speed estimated for the moving object HO.

When the determination of the jump-out possibility results in "low," the vehicle As is allowed to perform the travel behavior compliant with a travel route PR even if the blind-spot region BS exists. When the determination of the jump-out possibility results in "high," the vehicle As is inhibited from performing the travel behavior compliant with a travel route PR. Therefore, a threshold value between "low" and "high" in the determination of a jump-out possibility is settled based on whether the vehicle As can perform the travel behavior compliant with a travel route PR without causing (or forcing) deceleration on the moving object HO assumed to exist in the blind-spot region BS. The blind-spot determination section 51 determines the jump-out possibility to be "low" when it is possible to complete the travel behavior compliant with a travel route PR without decelerating the moving object HO assumed to exist in the blind-spot region BS. When the travel behavior compliant with a travel route PR is performed and the moving object HO assumed to exist in the blind-spot region BS is caused to decelerate, the blind-spot determination section 51 determines the jump-out possibility to be "high." Incidentally, the determination of the jump-out possibility results in "low," may correspond to a case where the jump-out possibility is in a low state. The determination of the jump-out possibility results in "high," may correspond to a case where the jump-out possibility is in a high state.

To "cause the deceleration" signifies that the driver of a straight oncoming vehicle sees the vehicle As crossing the opposite lane, assumes the vehicle As to be a risk, and is highly likely to operate a brake. When there is a sufficient distance between the boundary of the blind-spot region BS and a travel route PR, for example, the driver of the straight oncoming vehicle can let the vehicle As cross in front without operating the brake even if the assumed the moving object HO effectively exists as a straight oncoming vehicle. This case does not "cause the deceleration." Incidentally, to "cause the deceleration" may mean "to force the deceleration".

The behavior determination section 52 provides a function portion that performs a behavior determination process (see S20 in FIG. 2 and FIG. 4) included in the behavior control process and determines the behavior of the vehicle As. The behavior determination section 52 outputs a behavior request instruction to the exterior notification device 30 and the vehicle control device 40 to control the devices 30 and 40. When the blind-spot determination section 51 specifies the blind-spot region BS, the behavior determination section 52 limits the travel behavior of the vehicle As to be capable of passing through near the blind-spot region BS in a smooth and less risky way. The behavior determination section 52 includes a function to perform the travel behavior of the vehicle As in compliance with a travel route PR and a function to decrease the jump-out possibility from the blind-spot region BS if specified.

The behavior determination section 52 outputs a behavior request instruction to the vehicle control device 40 so that the vehicle As can perform the autonomous travel by using the travel environment recognition result acquired from the external information recognition device 20 and a travel route PR. When the blind-spot determination section 51 does not specify the blind-spot region BS, the behavior determination section 52 allows the vehicle As to perform the travel behavior compliant with a travel route PR in conjunction with the vehicle control device 40.

When the blind-spot determination section 51 specifies the blind-spot region BS, the behavior determination section 52 allows the vehicle As to reduce speed or stop before passing through a risky area associated with the blind-spot region BS. The behavior determination section 52 changes the behavior of the vehicle As based on the jump-out possibility from the specified the blind-spot region BS (see S121 in FIG. 4). When the blind-spot determination section 51 determines the jump-out possibility to be "none," the behavior determination section 52 allows the vehicle As to perform the travel behavior compliant with a travel route PR similarly to the case where the blind-spot region BS is not specified (see S122 in FIG. 4).

Figure 6:
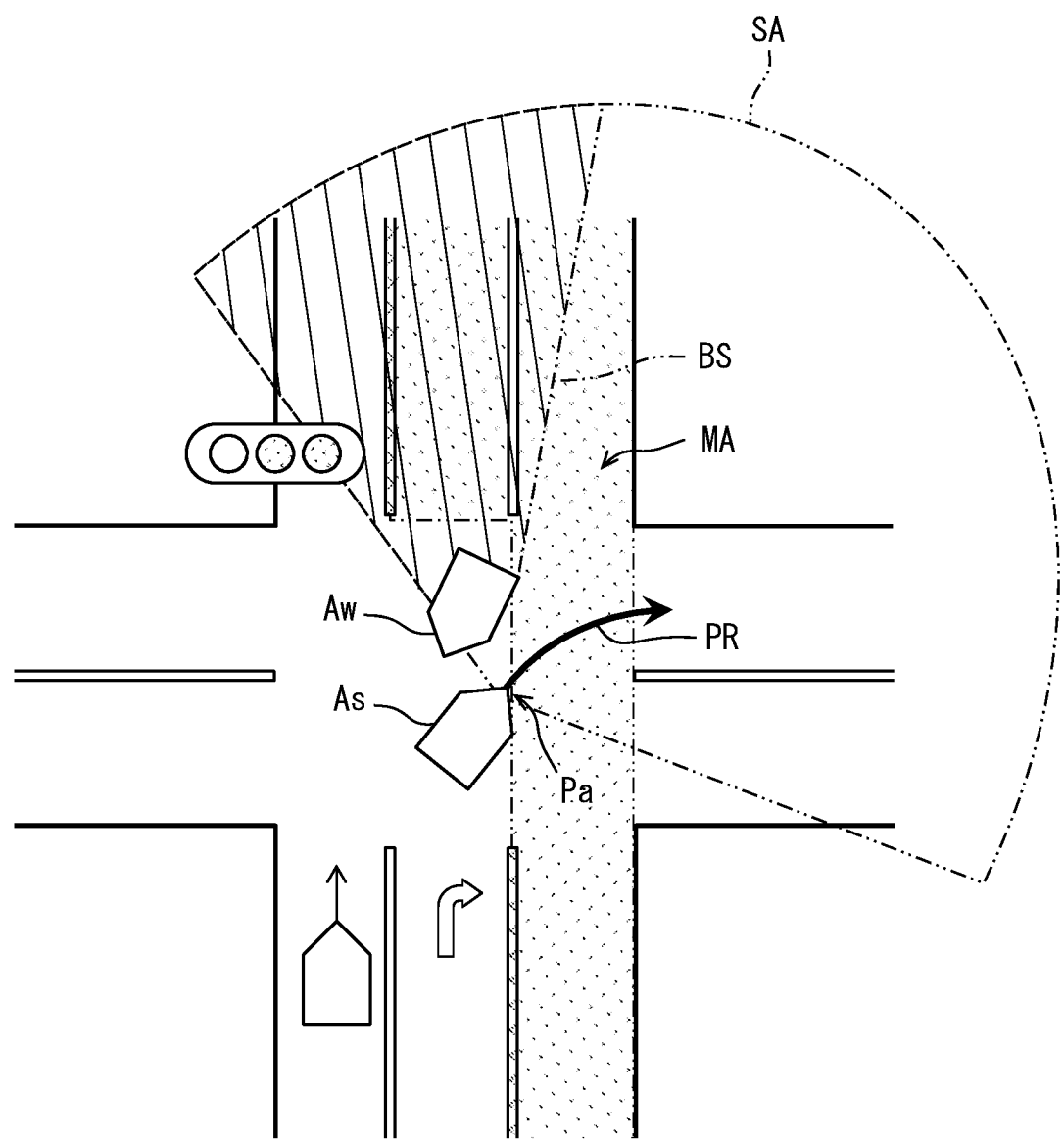
FIG. 6 is a diagram illustrating how possibility reduction behavior reduces a blind-spot region by moving to a blind-spot reduction position.

When the blind-spot determination section 51 determines the jump-out possibility to be present, the behavior determination section 52 starts a possibility reduction behavior before allowing the vehicle As to perform the travel behavior compliant with a travel route PR. The possibility reduction behavior signifies a vehicle behavior that decreases the current jump-out possibility of the moving object HO from the blind-spot region BS and provides mutually low-risk states even if the moving object HO effectively exists in the blind-spot region BS. The behavior determination section 52 performs a transferal behavior and a notification behavior as possibility reduction behaviors. The transferal behavior allows the vehicle As to gradually move to a blind-spot reduction position Pa (see FIG. 6) that narrows the blind-spot region BS. The notification behavior uses the exterior notification device 30 to notify the surroundings that the travel behavior starts. Besides, the behavior determination section 52 can perform a telecommunications notification behavior (see S124 and S126 in FIG. 4) and a non-telecommunications notification behavior (see S128 in FIG. 4) as notification behaviors.

The behavior determination section 52 performs the possibility reduction behavior whose contents depend on the level of the jump-out possibility. When the jump-out possibility is "high," for example, the behavior determination section 52 attempts to perform the transferal behavior toward the blind-spot reduction position Pa. The vehicle As travels forward along a travel route PR according to the transferal behavior toward the blind-spot reduction position Pa. The behavior determination section 52 determines whether movement toward the blind-spot reduction position Pa is possible (see S123 in FIG. 4). If the movement is determined to be possible, the behavior determination section 52 performs the notification behavior (see S124 in FIG. 4) and allows the vehicle As to start moving toward the blind-spot reduction position Pa (see S125 in FIG. 4). In this case, the notification behavior is assumed to be the telecommunications notification behavior that notifies the start of the travel behavior to the surroundings by using the wireless communication of the exterior communication device. Namely, the non-telecommunications notification behavior is avoided. In other words, in a case where the jump-out possibility is determined to be in the high state, the telecommunications notification behavior is performed and the non-telecommunications notification behavior is not performed. The transferal behavior limits the traveling speed of the vehicle As to a slow speed such as approximately 5 km/h. If it is impossible to move the vehicle As, the behavior determination section 52 allows the exterior notification device 30 to perform the telecommunications notification behavior by using an exterior communication device (see S126 in FIG. 4) and stops the vehicle As (see S127 in FIG. 4).

Figure 4:
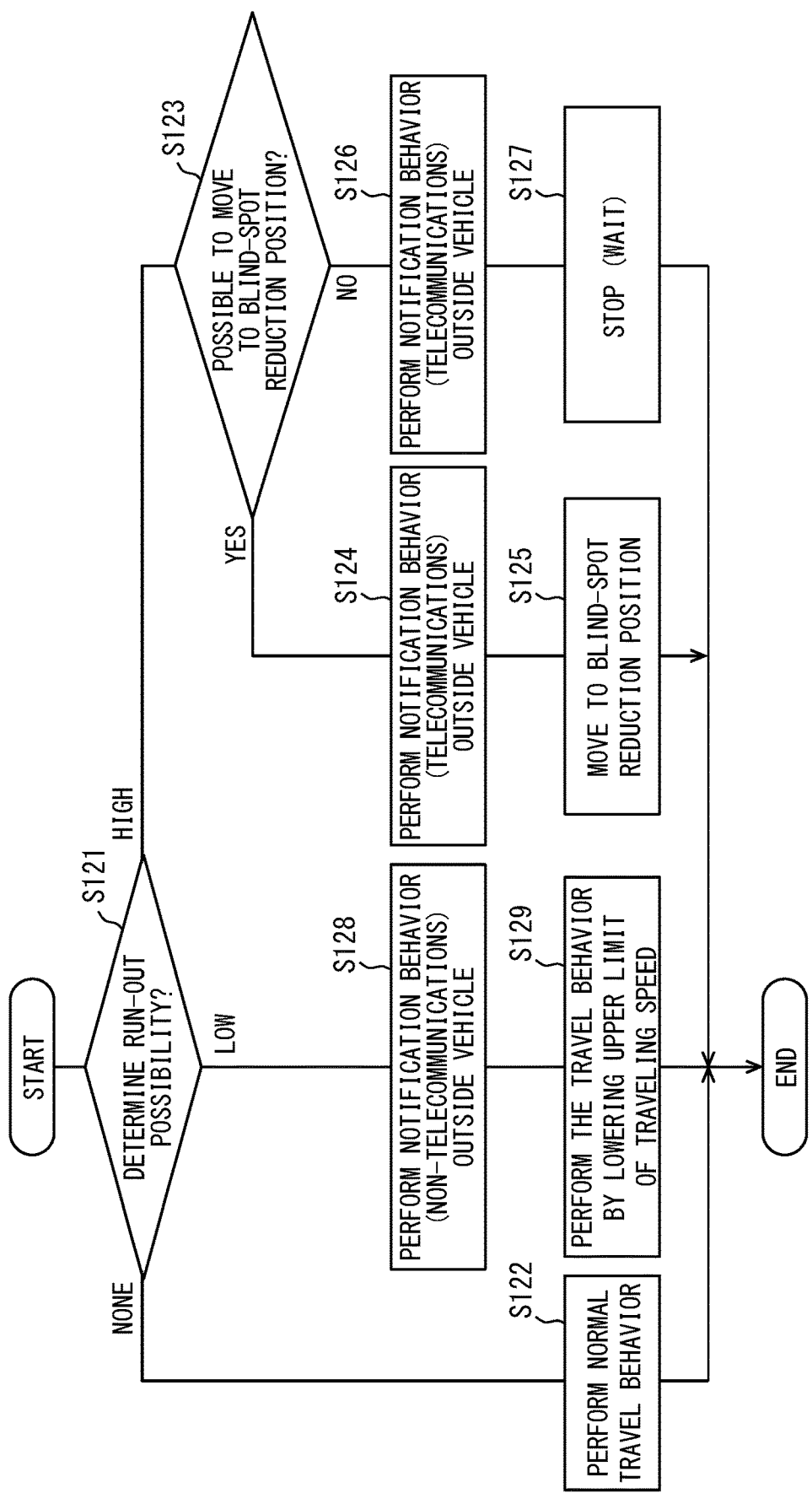
FIG. 4 is a flowchart illustrating details of a behavior determination process that constitutes a sub-process of the behavior control process and is performed when a vehicle makes turns.

When the jump-out possibility is "low" or the transferal behavior toward the blind-spot reduction position Pa causes the jump-out possibility to be "low," the behavior determination section 52 performs the notification behavior (see S128 in FIG. 4) and performs the travel behavior (see S129 in FIG. 4). In this case, the notification behavior is assumed to be the non-telecommunications notification behavior as headlight flashing using the headlight HL (see FIG. 7). When the jump-out possibility is "low," the travel behavior is assumed to be a limited travel behavior distinguished by the traveling speed whose upper limit is smaller than the normal travel behavior.

Figure 10:
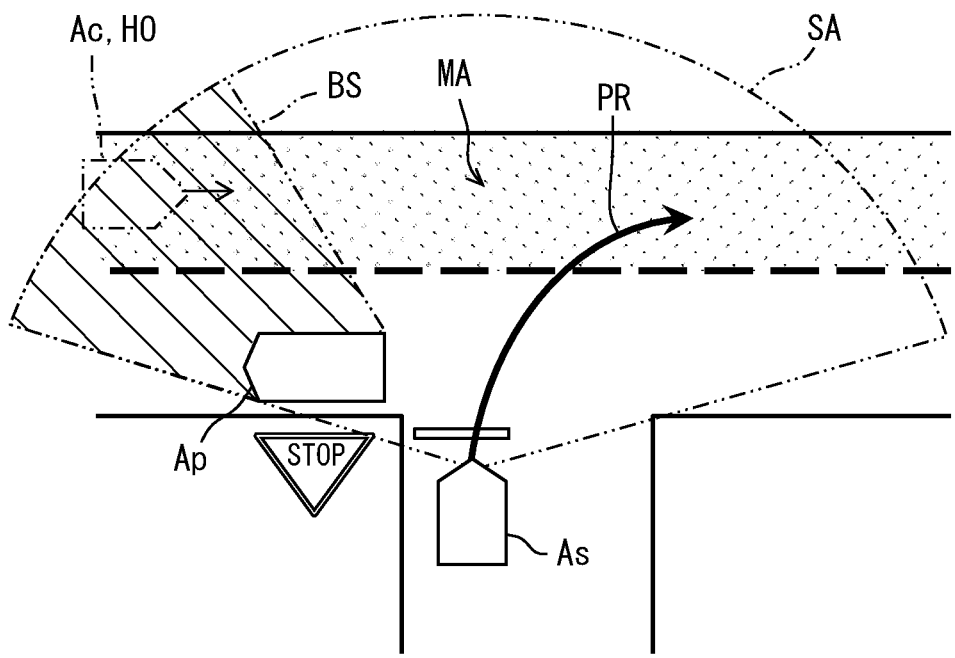
FIG. 10 is a diagram illustrating the behavior of a subject vehicle based on the behavior control process in a travel scene to make a right turn at a T-junction with no traffic signal in conjunction with FIG. 11.
Figure 11:
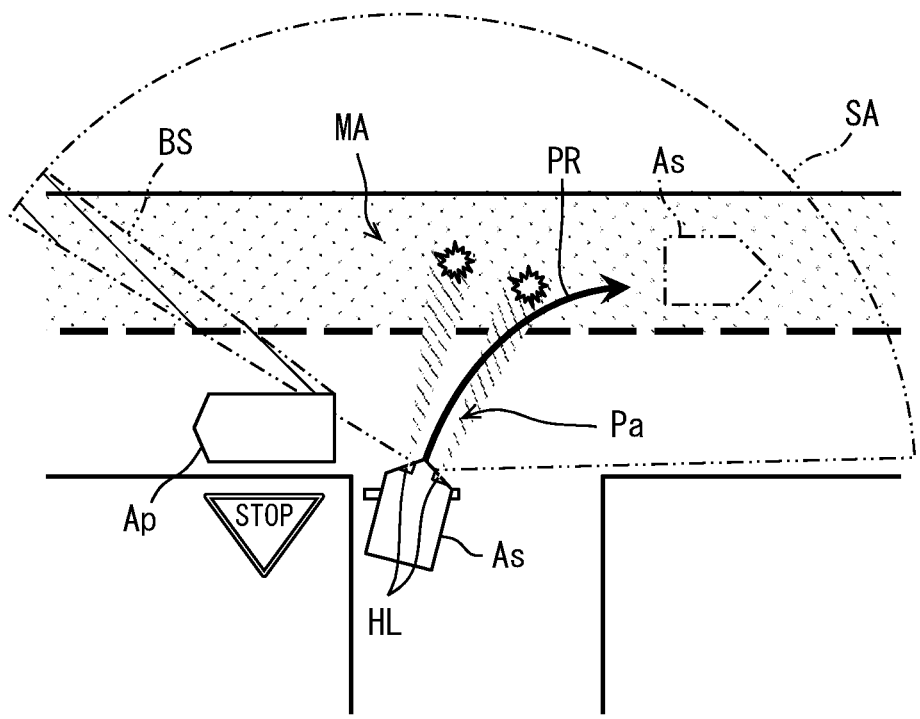
FIG. 11 is a diagram illustrating how possibility reduction behavior reduces a blind-spot region by moving to a blind-spot reduction position in a travel scene to make a right turn at a T-junction.

Based on FIGS. 5 through 11, while referring to FIG. 1, the description below explains two examples of the state transition in a travel scene where the vehicle As turns right at an intersection based on the behavior control process. FIGS. 5 through 9 illustrate travel scenes of turning right at an intersection (crossroad) equipped with a traffic signal. FIGS. 10 and 11 illustrate travel scenes of turning right at an intersection (T-junction) equipped with no traffic signal. In the description below, the vehicle As mounted with the automatic operation ECU 100 is depicted as "the subject vehicle As" to be distinguished from a different vehicle.

Turning Right at an Intersection Equipped With a Traffic Signal

Figure 5:
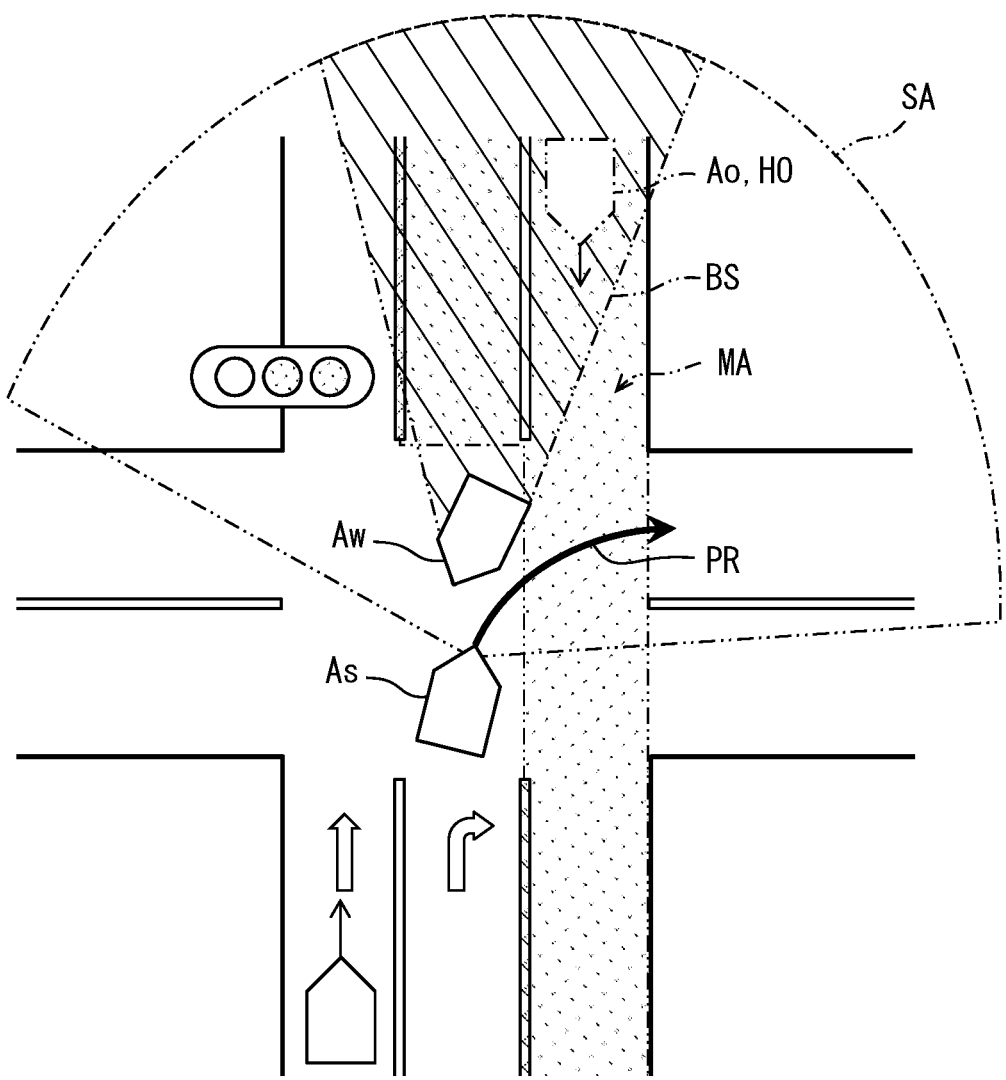
FIG. 5 is a diagram illustrating the behavior of a subject vehicle based on the behavior control process in a travel scene to make a right turn at an intersection in conjunction with FIGS. 6 through 9.

When turning right at the intersection, the subject vehicle As enters the intersection from a right turn lane as illustrated in FIG. 5. According to the travel scene as illustrated in FIG. 5, the traffic signal shows green. In such a travel scene, there may be a waiting vehicle Aw that is positioned ahead of the subject vehicle As and waits to turn right in the direction opposite to the subject vehicle As. The waiting vehicle Aw causes a blind spot in the recognition range SA for the object detector 22 of the subject vehicle As.

In the above-described travel scene, the blind-spot determination section 51 defines the priority monitoring range MA (see the dotted range in FIG. 5) based on the high-precision map data. The priority monitoring range MA corresponds to a region of the opposite lane intersecting with a travel route PR for the vehicle As. Besides, the blind-spot determination section 51 specifies the blind-spot region BS caused by the waiting vehicle Aw so as to include part of the priority monitoring range MA based on the travel environment recognition result. The blind-spot determination section 51 assumes a straight oncoming vehicle Ao to be virtual the moving object HO in the blind-spot region BS so that the straight oncoming vehicle Ao is assumed to travel the opposite lane toward a travel route PR. The blind-spot determination section 51 settles a supposed moving speed of the straight oncoming vehicle Ao. Then, the blind-spot determination section 51 determines a jump-out possibility of the straight oncoming vehicle Ao. According to the situation as illustrated in FIG. 5, the jump-out possibility is determined to be "high."

The behavior determination section 52 performs the possibility reduction behavior based on the jump-out possibility determination result from the blind-spot determination section 51. Specifically, the behavior determination section 52 performs the telecommunications notification behavior using the exterior communication device and allows the subject vehicle As to gradually move toward the blind-spot reduction position Pa illustrated in FIG. 6 while avoiding the waiting vehicle Aw. For example, the blind-spot reduction position Pa is set at a boundary that prevents the subject vehicle As from entering the region of the opposite lane.

As above, the transferal behavior toward the blind-spot reduction position Pa greatly decreases the area of the blind-spot region BS caused by the waiting vehicle Aw in the priority monitoring range MA. The result is to confirm the absence of the straight oncoming vehicle Ao (see FIG. 5) near the subject vehicle As. The jump-out possibility determined by the blind-spot determination section 51 changes to "low" from "high."

Figure 7:
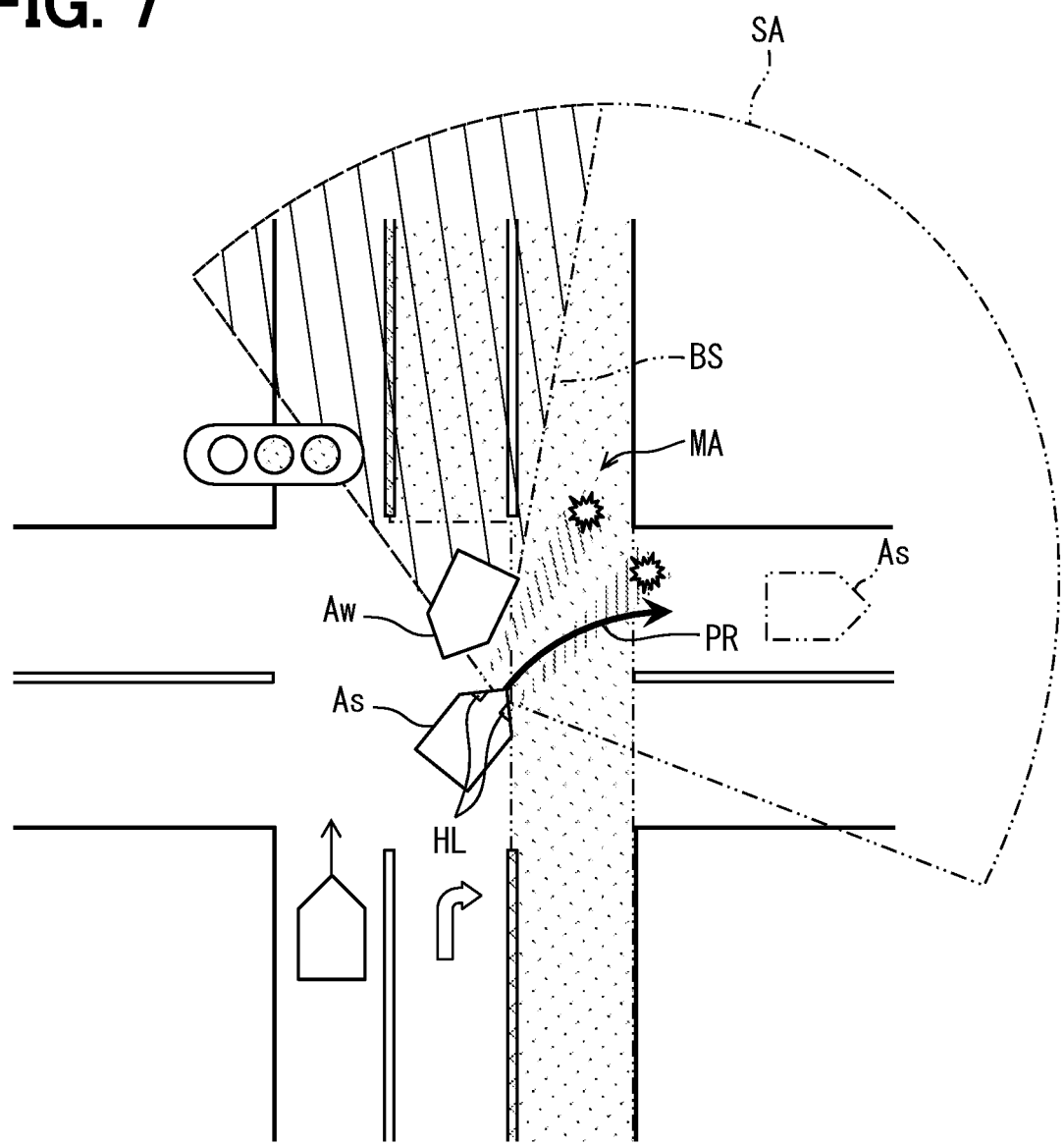
FIG. 7 is a diagram illustrating how a subject vehicle starts travel behavior after performing non-telecommunications notification behavior.

As illustrated in FIG. 7, the behavior determination section 52 performs a non-telecommunications notification behavior using the headlight HL, namely, headlight flashing, based on the change to the "low" jump-out possibility. After performing the headlight flashing, the behavior determination section 52 allows the subject vehicle As to perform the travel behavior compliant with a travel route PR. Consequently, the subject vehicle As leaves the intersection and moves to a cruising lane subsequent to the right turn lane.

Figure 8:
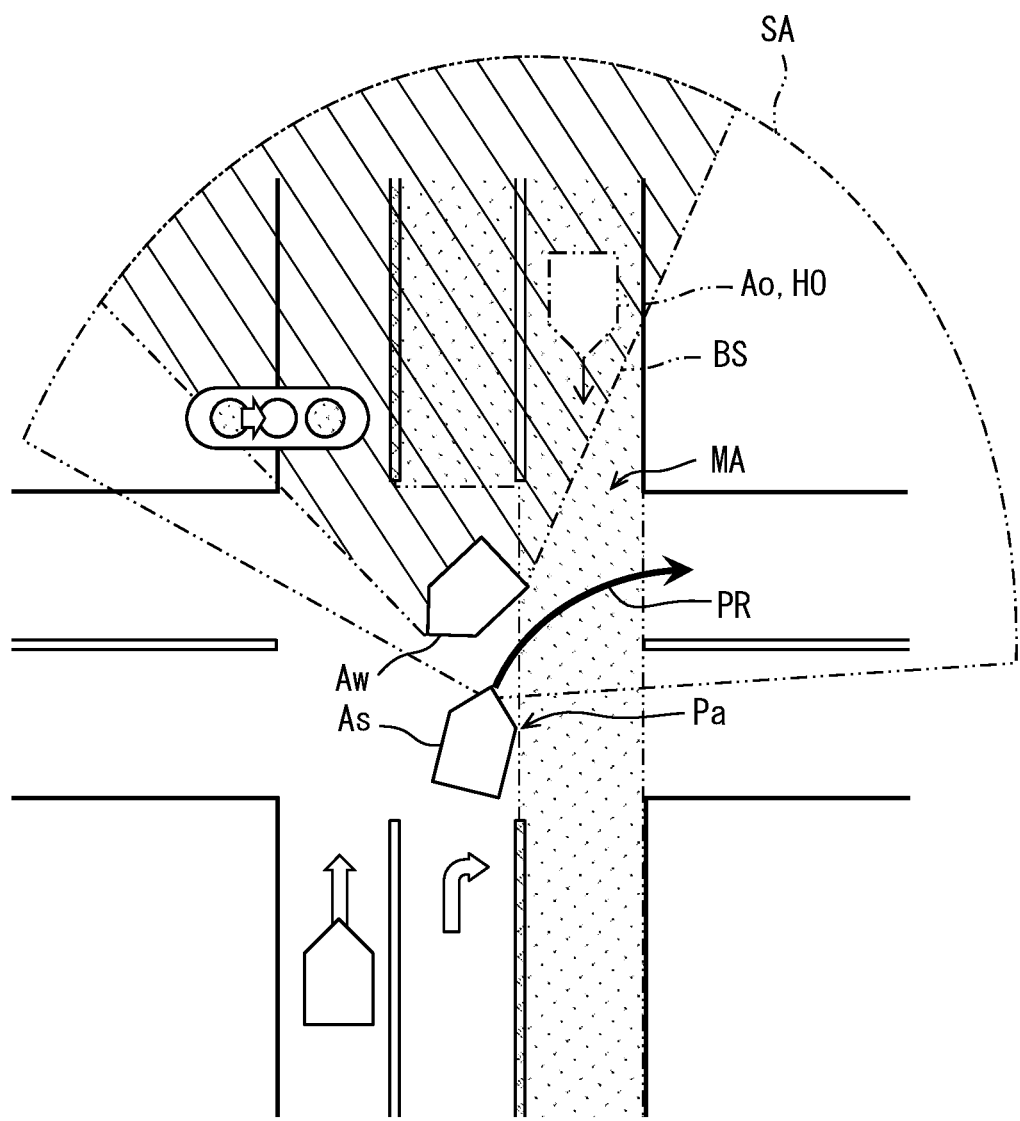
FIG. 8 is a diagram illustrating a situation where a subject vehicle awaits a change in a traffic signal when it is difficult to reduce a blind-spot region.

As illustrated in FIG. 8, however, there may be a case where the blind-spot region BS cannot be sufficiently reduced depending on the position relationship between the subject vehicle As and the waiting vehicle Aw even if the subject vehicle As is moved to the blind-spot reduction position Pa. In this case, the straight oncoming vehicle Ao assumed in the blind-spot region BS keeps the jump-out possibility "high" even after the move to the blind-spot reduction position Pa. Then, the behavior determination section 52 allows the subject vehicle As to stop at the blind-spot reduction position Pa and to wait until the waiting vehicle Aw moves or the traffic signal changes.

Figure 9:
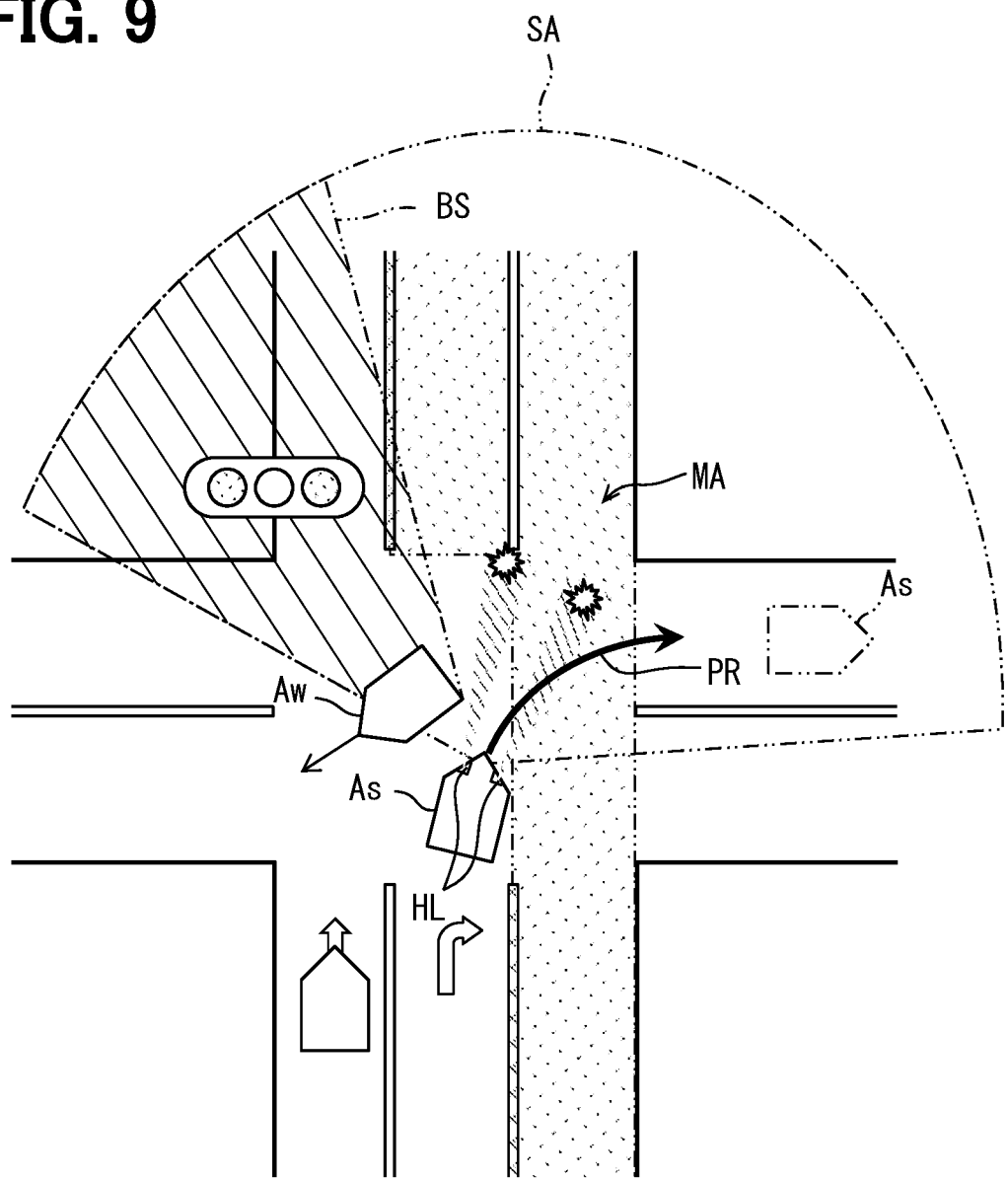
FIG. 9 is a diagram illustrating a reduction of a blind-spot region due to movement of a waiting vehicle after a change in the traffic signal.

For example, when the traffic signal changes to yellow from green while the subject vehicle As is waiting, as illustrated in FIG. 9, the waiting vehicle Aw starts traveling in the direction to leave the recognition range SA. The result is to greatly reduce the area of the blind-spot region BS caused by the waiting vehicle Aw in the priority monitoring range MA. The jump-out possibility determined by the blind-spot determination section 51 changes to "low" from "high." As a result, the behavior determination section 52 performs the headlight flashing using the headlight HL as a non-telecommunications notification behavior, starts the travel behavior compliant with a travel route PR, and allows the subject vehicle As to leave the intersection.

Turning Right at a T-Junction Without a Traffic Signal

As illustrated in FIG. 10, the subject vehicle As is going to exit from a side road to an arterial road. In this case, the subject vehicle As temporarily stops at a stop line provided at an entry to the arterial road. According to the travel scene in FIG. 10, parking vehicle Ap exists to the left of the exit from the side road. Parking vehicle Ap causes a blind spot in the recognition range SA for the object detector 22 of the subject vehicle As.

In this case, the blind-spot determination section 51 settles the priority monitoring range MA, namely, a region (see a dotted range in FIG. 10) of the lane directed to the right viewed from the subject vehicle As. The blind-spot determination section 51 also specifies the blind-spot region BS in the priority monitoring range MA caused by parking vehicle Ap. Moreover, the blind-spot determination section 51 assumes different vehicle Ac to be virtual the moving object HO in the blind-spot region BS. Different vehicle Ac is assumed to straight travel to the right of the subject vehicle As to approach a travel route PR. Then, the blind-spot determination section 51 determines a jump-out possibility of the assumed different vehicle Ac. The jump-out possibility is determined to be "high" according to the situation in FIG. 10.

The behavior determination section 52 performs the telecommunications notification behavior using an exterior communication device as a possibility reduction behavior. Besides, the behavior determination section 52 allows the subject vehicle As to gradually advance toward the blind-spot reduction position Pa illustrated in FIG. 11. In this case, the blind-spot reduction position Pa is settled at a position that does not exceed ahead of parking vehicle Ap (toward the lane directed to the right). The travel behavior toward the blind-spot reduction position Pa greatly decreases the area of the blind-spot region BS caused by parking vehicle Ap. The result is to confirm the absence of different vehicle Ac (see FIG. 10). The jump-out possibility determined by the blind-spot determination section 51 changes to "low" from "high."

Based on the above-described change in the jump-out possibility, the behavior determination section 52 allows the subject vehicle As to start the travel behavior compliant with a travel route PR after performing the headlight flashing using the headlight HL. Then, the subject vehicle As joins the arterial road and transitions to the state of straight traveling along the cruising lane.

Based on FIGS. 12 and 13, while referring to FIG. 1, the description below explains the behavior control process in detail on condition that there is provided a travel route PR allowing the subject vehicle As to make a lane change.

Figure 12:
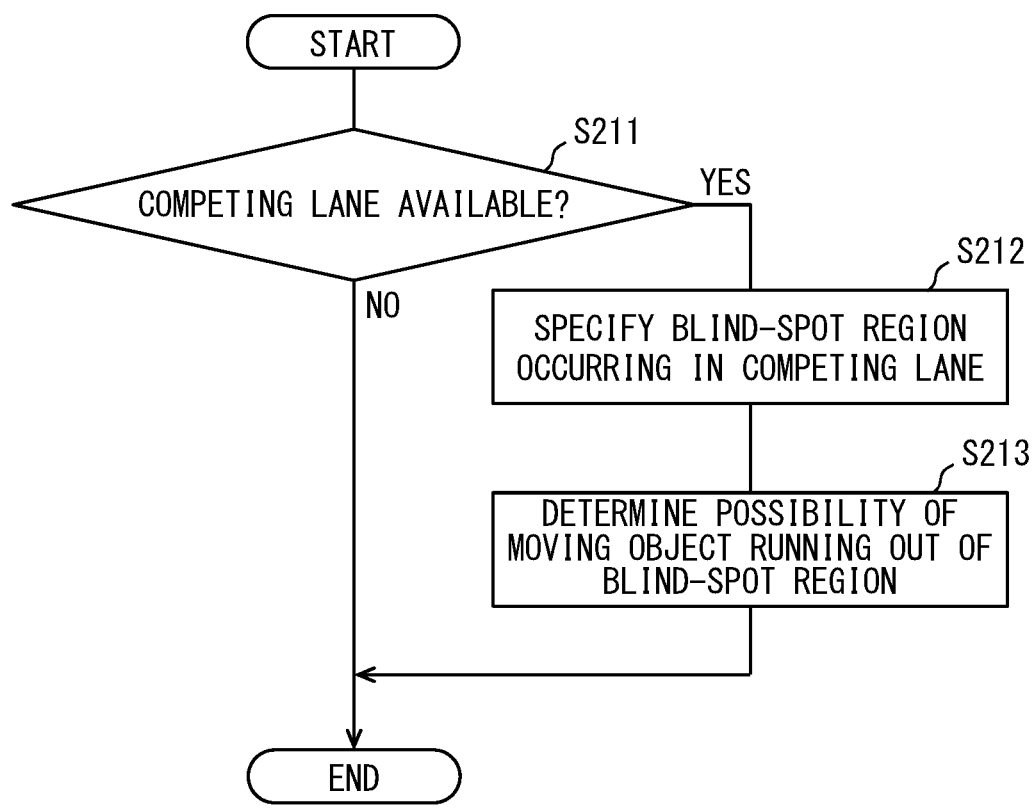
FIG. 12 is a flowchart illustrating details of the blind-spot determination process that is performed when a lane is changed.

During the blind-spot determination process (see S10 in FIG. 2 and FIG. 12) for the lane change scene, the blind-spot determination section 51 determines whether a competing lane exists, based on a travel route PR and the high-precision map data (see S211 in FIG. 12). The blind-spot determination section 51 settles a "destination lane" and a "competing lane." The destination lane is included in a travel route PR and is defined as a destination of the lane change made by the subject vehicle As. The competing lane enables a lane change to the destination lane and differs from a subject vehicle cruising lane where the subject vehicle As currently travels. For example, the competing lane is positioned opposite the subject vehicle cruising lane through the intervention of the destination lane. When there is no competing lane, the blind-spot determination section 51 determines that the blind-spot region BS does not exist.

When determining the existence of a competing lane, the blind-spot determination section 51 defines a region of the competing lane as the priority monitoring range MA and specifies the blind-spot region BS (see FIG. 14) occurring in the competing lane (see S212 in FIG. 12). Besides, the blind-spot determination section 51 assumes the moving object HO (see FIG. 14) in the specified the blind-spot region BS and determines a possibility of the moving object HO jumping out to the destination lane (see S213 in FIG. 12). The lane change scene uses the criterion substantially equal to that in the travel scene when determining a jump-out possibility to be "none," "low," or "high."

During the behavior determination process for the lane change scene (see S20 in FIG. 2 and FIG. 13), the behavior determination section 52 cooperates with the vehicle control device 40 and allows the subject vehicle As to make a lane change compliant with a travel route PR. When the blind-spot determination section 51 does not specify the blind-spot region BS, the behavior determination section 52 allows the subject vehicle As to perform a normal lane change. When the blind-spot region BS is specified, the behavior determination section 52 changes the behavior of the subject vehicle As based on a jump-out possibility determination result from the blind-spot determination section 51 (see S221 in FIG. 13). If the blind-spot determination section 51 determines the jump-out possibility to be "none," the behavior determination section 52 allows the subject vehicle As to perform the normal lane change compliant with a travel route PR similarly to the case where the blind-spot region BS is not specified (see S222 in FIG. 13).

When the blind-spot determination section 51 determines the existence of a jump-out possibility, the behavior determination section 52 performs the possibility reduction behavior before allowing the subject vehicle As to make a lane change compliant with a travel route PR. Specifically, when the jump-out possibility is "high," the behavior determination section 52 controls the subject vehicle As to accelerate or decelerate, performs the transferal behavior relative to different vehicle Ab (see FIG. 15) causing a blind spot in the competing lane, and distances the subject vehicle As from different vehicle Ab.

Figure 13:
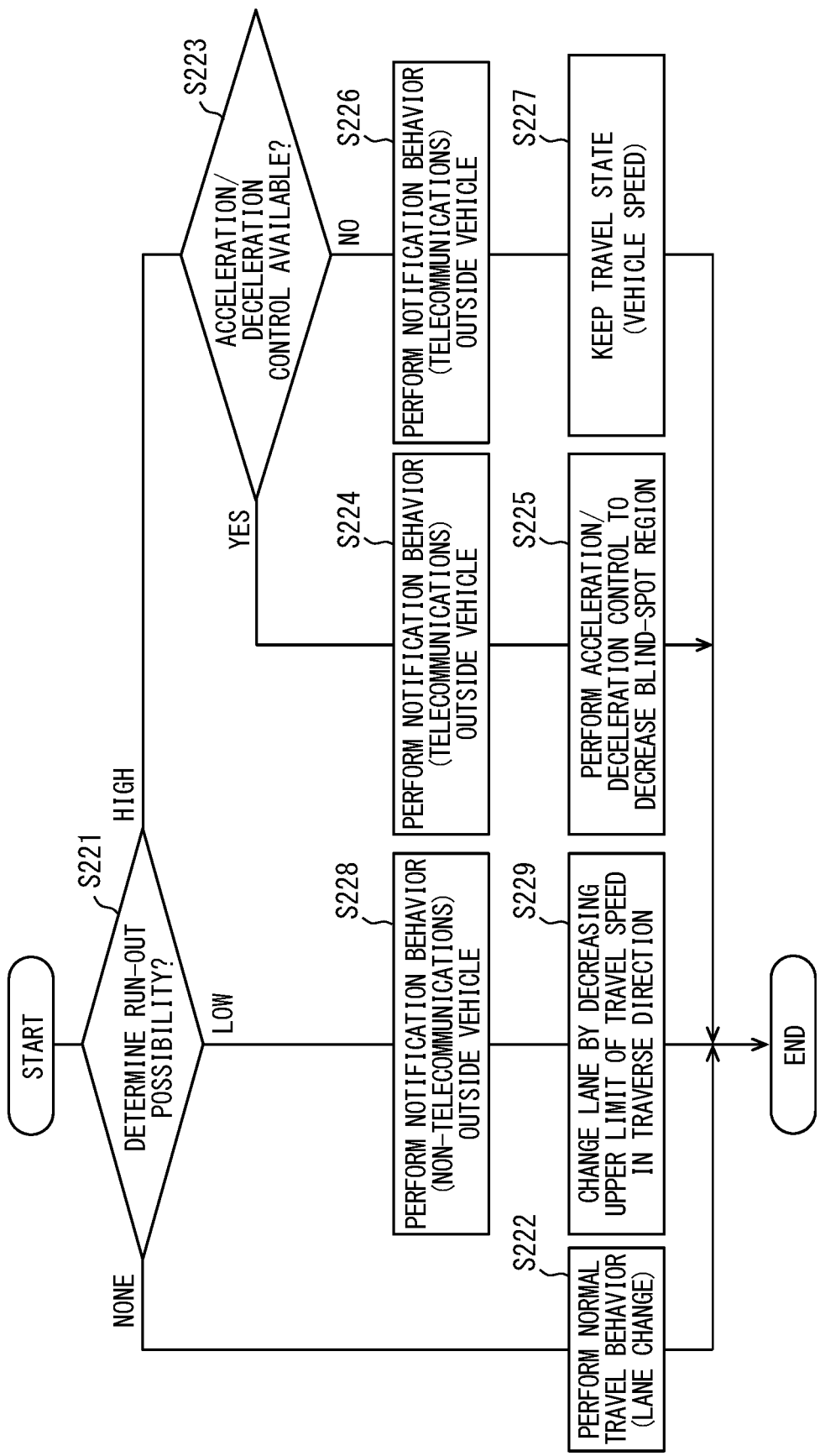
FIG. 13 is a flowchart illustrating details of the behavior determination process performed when a lane is changed.

In this case, the behavior determination section 52 determines whether the acceleration/deceleration control is available for the subject vehicle As (see S223 in FIG. 13). If the acceleration/deceleration control is available, the behavior determination section 52 allows the exterior communication device to perform the telecommunications notification behavior (see S224 in FIG. 13) and performs the acceleration/deceleration control to decrease the blind-spot region BS (see S225 in FIG. 13). There may be a case where none of the acceleration control and the deceleration control is available due to the existence of a preceding vehicle and a subsequent vehicle. Then, the behavior determination section 52 allows the exterior communication device to perform the telecommunications notification behavior (see S226 in FIG. 13). The behavior determination section 52 allows the subject vehicle As to keep the travel state (see S227 in FIG. 13) and wait until different vehicle Ab goes away.

When the jump-out possibility is "low" or the transferal behavior (acceleration/deceleration control) causes the jump-out possibility to change to "low." In such a case, the behavior determination section 52 performs the non-telecommunications notification behavior (see S228 in FIG. 13) and then performs a lane change (see S229 in FIG. 13). The lane change, in this case, decreases the upper limit of the travel speed in the traverse direction to be lower than the upper limit for the normal lane change. Therefore, the lane change, in this case, increases the road distance needed to start and complete the lane change to be longer than the road distance needed for the normal lane change.

Based on FIGS. 14 and 15, while referring to FIG. 1, the description below explains an example of the state transition in a travel scene where the vehicle As changes the lane based on the behavior control process.

Figure 14:
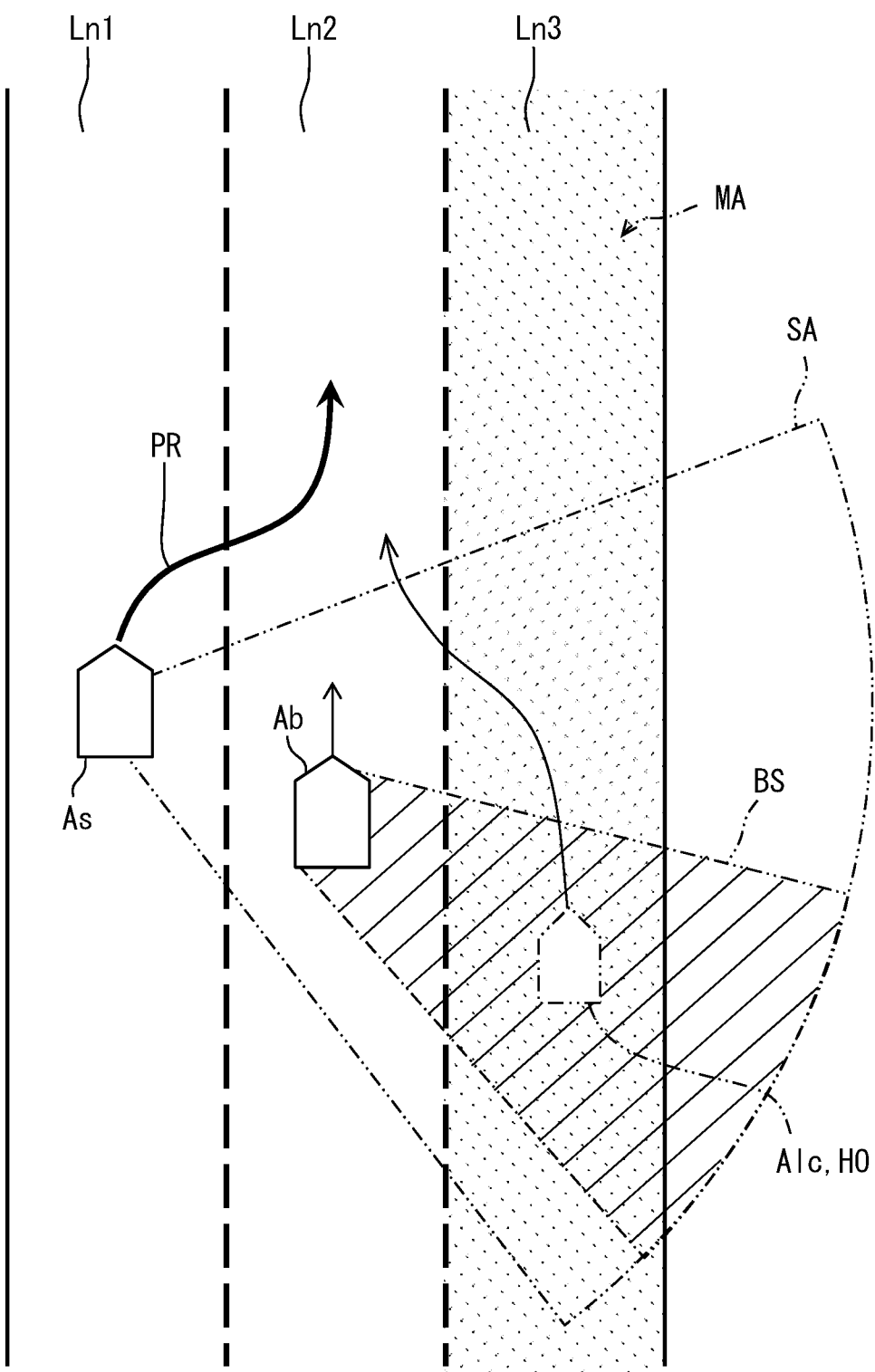
FIG. 14 is a diagram illustrating the behavior of a subject vehicle based on the behavior control process in a travel scene to make a lane change from the left lane to the center lane in conjunction with FIG. 15.
Figure 15:
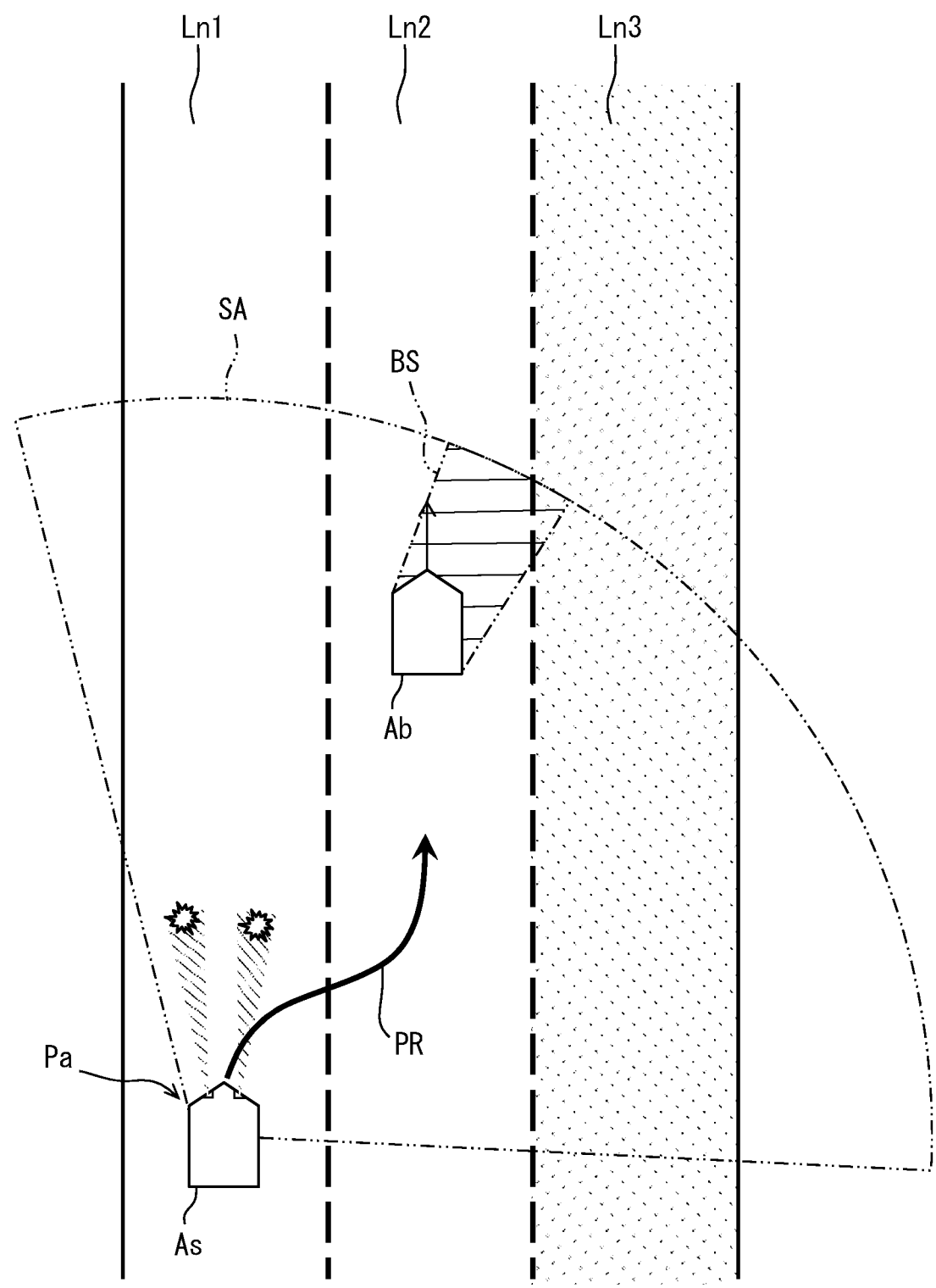
FIG. 15 is a diagram illustrating how possibility reduction behavior reduces a blind-spot region by moving to a blind-spot reduction position in a travel scene to make a lane change.

In the travel scene as illustrated in FIG. 14, the subject vehicle As travels the leftmost lane (may also be described as "first lane Ln1") of three lanes belonging to a road. The subject vehicle As is assigned with a travel route PR to make a lane change to the center lane (may also be described as "second lane Ln2") from first lane Ln1. In the above-described travel scene, first lane Ln1 corresponds to the subject vehicle cruising lane and second lane Ln2 corresponds to the destination lane. The rightmost lane (may also be described as "third lane Ln3") corresponds to the competing lane. Different vehicle Ab existing on second lane Ln2 causes a blind spot in the recognition range SA for the object detector 22 of the subject vehicle As.

The blind-spot determination section 51 defines a region (see a dotted range in FIG. 14) of third lane Ln3 as the priority monitoring range MA. The blind-spot determination section 51 specifies the blind-spot region BS caused by different vehicle Ab to include part of the priority monitoring range MA. The blind-spot determination section 51 assumes competing vehicle Alc as virtual the moving object HO in the blind-spot region BS. Competing vehicle Alc is assumed to attempt changing the lane to second lane Ln2. Then, the blind-spot determination section 51 determines a jump-out possibility of competing vehicle Alc. The jump-out possibility is determined to be "high" according to the situation in FIG. 14.

The behavior determination section 52 performs the possibility reduction behavior represented by the telecommunications notification behavior using the exterior communication device. The behavior determination section 52 controls the traveling speed of the subject vehicle As to relatively move to the blind-spot reduction position Pa illustrated in FIG. 15 and allows the subject vehicle As to be distant from different vehicle Ab. The blind-spot reduction position Pa is settled to be remote from different vehicle Ab backward by a specified distance.

As a result of the transferal behavior, competing vehicle Alc (see FIG. 14) is confirmed to be absent due to a decrease in the blind-spot region BS in the recognition range SA. Therefore, the blind-spot determination section 51 changes the jump-out possibility to "low" from "high" as the determination. The behavior determination section 52 performs the non-telecommunications notification behavior such as headlight flashing and starts the lane change by controlling the travel speed in the traverse direction to be lower than the normal. As above, the subject vehicle As changes the lane to second lane Ln2 and transitions to the state of straight traveling along second lane Ln2.

When a travel route PR includes the blind-spot region BS for the external information recognition device 20 and there is a jump-out possibility of the moving object HO from the blind-spot region BS, the present embodiment described hitherto performs the possibility reduction behavior before the travel behavior. The possibility reduction behavior, when performed, enables the subject vehicle As to start the travel behavior on condition that there is a decrease in the jump-out possibility of the moving object HO to a travel route PR from the blind-spot region BS. As a result, it is possible to enable the subject vehicle As to continue the travel behavior compliant with a travel route PR even when the blind-spot region BS exists in a travel route PR including turns or a lane change.

Besides, the present embodiment determines that the jump-out possibility increases as the area of the blind-spot region BS increases. The possibility of causing the moving object HO to exist increases as the area of the blind-spot region BS increases, and consequently increases the possibility of causing the moving object HO to jump out to a travel route PR. When the area of the blind-spot region BS is used to estimate a jump-out possibility, the automatic operation ECU 100 can highly accurately specify the situation of a high jump-out possibility requiring a careful travel behavior based on the acquirable information.

The present embodiment performs the possibility reduction behavior represented by the travel behavior that moves the subject vehicle As to the blind-spot reduction position Pa decreasing the area of the blind-spot region BS. As above, the subject vehicle As sufficiently decreases the blind-spot region BS, confirms the absence of highly risky the moving object HO in the blind-spot region BS, and then can perform the travel behavior such as turns and a lane change.

When the travel behavior cannot sufficiently decrease the blind-spot region BS, the behavior determination section 52 according to the present embodiment awaits a change in the traffic signal. Then, the autonomous travel enables passage through the intersection without causing unnecessary risk. Besides, the behavior determination section 52 can restart the right-turn behavior similar to the driver operation at the timing when the traffic signal changes to yellow or red.

The present embodiment assigns a supposed moving speed to the moving object HO in the blind-spot region BS. The jump-out possibility is assumed to increase as the supposed moving speed increases. The moving object HO increases a risk to the subject vehicle As as the speed of jumping out of the blind-spot region BS increases. When the supposed moving speed of the moving object HO is used to estimate the jump-out possibility, the automatic operation ECU 100 can highly accurately specify the situation of a high jump-out possibility requiring a careful travel behavior based on the acquirable information.

The present embodiment changes the contents of the possibility reduction behavior depending on the levels of a jump-out possibility. In the situation of a high jump-out possibility, the subject vehicle As can start the travel behavior by thoroughly performing the possibility reduction behavior and sufficiently reducing the risk in the blind-spot region BS. In the situation of a low jump-out possibility, the possibility reduction behavior can be simplified, enabling the subject vehicle As to smoothly continue the travel behavior.

According to the present embodiment, the notification behavior performed as the possibility reduction behavior notifies the surroundings of the subject vehicle As that the travel behavior compliant with a travel route PR starts. The notification behavior can previously notify the travel behavior performed by the subject vehicle As to the moving object HO in the blind-spot region BS such as a pedestrian and a driver. It is possible to further reduce the risk of the moving object HO jumping out of the blind-spot region BS during the travel behavior of the vehicle As even if the blind-spot region BS exists.

The present embodiment can provide the notification behavior represented by the telecommunications notification behavior using wireless communication and the non-telecommunications notification behavior using a means different from the wireless communication. The telecommunications notification behavior is felt more convenient than the non-telecommunications notification behavior but causes the reliability of recognition to be lower than the non-telecommunications notification behavior. The telecommunications notification behavior and the non-telecommunications notification behavior can be used as appropriate, making it possible to properly perform the possibility reduction behavior whose contents correspond to the level of a jump-out possibility.

When the moving object HO is assumed to be present in the blind-spot region BS, the present embodiment may force the moving object HO to decelerate as a result of performing the travel behavior compliant with a travel route PR. Then, the blind-spot determination section 51 determines the jump-out possibility to be "high." In this case, the behavior determination section 52 causes the subject vehicle As to limit the travel behavior. Meanwhile, it may be possible to perform the travel behavior compliant with a travel route PR without causing the moving object HO to decelerate when the moving object HO is assumed to be present in the blind-spot region BS. Then, the blind-spot determination section 51 determines the jump-out possibility to be "low." In this case, the behavior determination section 52 permits the travel behavior to start. Based on the above-described criterion to determine jump-out possibilities, the travel behavior of the subject vehicle As hardly poses a risk to the surroundings and is unlikely to be recognized as annoying behavior in the situation where the blind-spot region BS exists. The subject vehicle As can complete the travel behavior without giving the impression of a barrier to the surroundings and the moving object HO.

When the jump-out possibility is determined to be "high," the present embodiment stops the non-telecommunications notification behavior such as headlight flashing, for example. It is possible to avoid the subject vehicle As from possibly annoying the surroundings by giving the surroundings an impression that a complicated possibility reduction behavior is performed to strenuously attempt continuing the travel behavior.

According to the above-described embodiment, the processor 11 is comparable to a "processor." The external information recognition device 20 is comparable to an "environment recognition portion." The automatic operation ECU 100 is comparable to a "behavior control apparatus."

Other Embodiments

While there has been described an embodiment of the present disclosure, the disclosure is not interpreted based exclusively on the embodiment but is applicable to various embodiments and combinations within the spirit and scope of the disclosure.

The above-described embodiment has explained the example in which the priority monitoring range MA and the blind-spot region BS are provided on a road and a different vehicle is assumed as the moving object HO. However, the blind-spot determination section 51 can provide the blind-spot region BS on a sidewalk including a crosswalk and a bicycle path. The blind-spot determination section 51 settles types and supposed moving speeds of the moving object HO corresponding to a region assigned with the blind-spot region BS. When a pedestrian or a cyclist is assumed to be the type of the moving object HO, for example, the blind-spot determination section 51 settles a supposed moving speed specifically corresponding to each type and determines a jump-out possibility concerning the moving object HO.

A first modification of the above-described embodiment performs the possibility reduction behavior only represented by the travel behavior, not the notification behavior. The first modification performs the travel behavior to the blind-spot reduction position Pa as needed and starts the travel behavior based on the result of determining the jump-out possibility to be "low." A second modification of the above-described embodiment performs the possibility reduction behavior only represented by the notification behavior, not the travel behavior. The second modification notifies the surroundings of the start of the travel behavior and then starts the travel behavior at a speed slower than the normal.

The second modification also uses sound and light as the non-telecommunications notification behavior. Specifically, the non-telecommunications notification behavior is performed by allowing an exterior speaker to generate the warning sound and an audio message such as "turn to the right." Moreover, the second modification performs the non-telecommunications notification behavior by operating a rotating light (warning lamp) such as a rotary beacon light.

A third modification of the above-described embodiment differs from the above-described embodiment in the method of using the telecommunications notification behavior and the non-telecommunications notification behavior. The third modification always uses the telecommunications notification behavior and the non-telecommunications notification behavior together. However, only one of the telecommunications notification behavior and the non-telecommunications notification behavior may be performed.

According to a fourth modification of the above-described embodiment, the blind-spot determination section 51 assumes a jump-out possibility to be one of "positive" and "negative." The behavior determination section 52 according to the fourth modification performs the possibility reduction behavior based on the "positive" determination of the jump-out possibility. According to a fifth modification of the above-described embodiment, the blind-spot determination section 51 assigns jump-out possibilities with numeric values such as levels 1 through 5, for example. The behavior determination section 52 according to the fifth modification performs the possibility reduction behavior corresponding to the level determined by the blind-spot determination section 51. A larger numeric value corresponding to the jump-out possibility level performs the behavior that more effectively reduces the possibility.

A sixth modification of the above-described embodiment determines the jump-out possibility level by using the information other than the width of the blind-spot region BS and the supposed moving speed. The jump-out possibility determination uses information stored at a place assigned with a travel route PR such as a traffic volume and a history of traffic accidents, for example. The jump-out possibility level may be determined by using a determination unit that uses input information represented by the width of the blind-spot region BS and the supposed moving speed, for example. The determination unit is previously generated through machine learning and is stored in the automatic operation ECU 100, for example.

A seventh modification of the above-described embodiment differs from the above-described embodiment in a threshold value that makes a distinction between "high" and "low" in the jump-out possibility determination performed by the blind-spot determination section 51. Specifically, when the moving object HO exists in the blind-spot region BS and does not approach the subject vehicle As too closely, and then is caused to decelerate, the blind-spot determination section 51 according to the seventh modification determines the jump-out possibility to be "low." The above-described determination criterion can smooth the traffic.

An eighth modification of the above-described embodiment differs from the above-described embodiment in the contents of the travel behavior when the jump-out possibility is determined to be "low." According to the eighth modification, the behavior determination section 52 performs the normal travel behavior similar to the absence of the blind-spot region BS even when the jump-out possibility is determined to be "low." According to a ninth modification of the above-described embodiment, the behavior determination section 52 makes turns and crosses an opposite lane at a speed whose upper limit is configurable to be higher than the normal when the jump-out possibility is determined to be "low."

According to a tenth modification of the above-described embodiment, the external information recognition device 20 can wirelessly or wiredly communicate with user terminals such as smartphones. A user such as a driver can use an application running on the user terminal to settle a route to the destination. The user terminal can allow the external information recognition device 20 to provide the automatic operation ECU 100 with information about the route to the destination and related high-precision map data. According to the tenth modification, the automatic operation ECU 100 may acquire information needed for the autonomous travel from a smartphone or a cloud server, for example.

The automatic operation ECU 100 may include one or more of the external information recognition device 20, the exterior notification device 30, and the vehicle control device 40. The blind-spot determination section 51 and the behavior determination section 52 provide function portions that may be installed on any of the external information recognition device 20, the exterior notification device 30, and the vehicle control device 40 or may be provided for different ECUs.

The functions provided by the automatic operation ECU according to the above-described embodiment are available as software and hardware to execute the software, only software, only hardware, or a complex combination of these. The recognition range SA provided by the external information recognition device 20 may be changed as appropriate according to the performance of an onboard sensor group provided as the object detector 22.

It is allowed to appropriately change forms of the storage medium to mainly store a program to embody the above-described behavior control method. For example, the storage medium is not limited to the configuration provided on a circuit substrate. The storage medium may be provided in the form of a memory card, inserted into a slot, and electrically connected to a control circuit of a central device. Moreover, the storage medium may be available as an optical disk and a hard disk drive from which a program is copied to the central device.

The vehicle installed with the automatic operation ECU is not limited to ordinary private vehicles but is also applicable to vehicles for rental cars, crewed vehicles for taxicabs, vehicles for ride-sharing, cargo vehicles, and buses. The automatic operation ECU may be mounted on vehicles that are specialized for unattended operation and are used for mobility as a service. The automatic operation ECU may be mounted on vehicles with the steering wheel on the right or left side. The travel behavior of the vehicle may be optimized based on the steering wheel position, namely, traffic regulations concerning left-side driving or right-side driving.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or a processing of the flowchart in the present application includes steps (also referred to as sections), each of which is represented, for example, as S10. Further, each step may be divided into several sub-steps, and several steps may be combined into a single step.

While various embodiments, configurations, and aspects of behavior control method and behavior control apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A behavior control method for controlling a behavior of a vehicle, the behavior control method being performed by at least one processor, the behavior control method comprising:

specifying a blind-spot region as blind-spot of an environment recognition portion along a travel route for the vehicle, the environment recognition portion being mounted on the vehicle and recognizing a travel environment;

determining a presence of a jump-out possibility of a moving object to the travel route from the blind-spot region;

performing a possibility reduction behavior to lower the jump-out possibility, in response to determining the presence of the jump-out possibility; and performing a travel behavior compliant with the travel route after starting the possibility reduction behavior, wherein:

the possibility reduction behavior includes a notification behavior notifying a surroundings of the vehicle of a start of the travel behavior by the vehicle;

the notification behavior includes
- a telecommunications notification behavior that notifies the surroundings of the vehicle, through wireless communication, of the start of the travel behavior by the vehicle; and
- a non-telecommunications notification behavior that notifies the surroundings of the vehicle, through at least one method different from the wireless communication, of the start of the travel behavior by the vehicle; and the determining of the presence of the jump-out possibility includes determining of a level of the jump-out possibility;

the determining of the level of the jump-out possibility comprises determining that the jump-out possibility is in a high state in response to determining that the moving object assumed to be present in the blind-spot region would be caused to decelerate in response to the vehicle performing the travel behavior; and in response to the jump-out possibility being determined to be in the high state, performing of the non-telecommunications notification behavior is not performed.

2. The behavior control method according to claim 1, wherein:
the level of the jump-out possibility increases as an area of the blind-spot region enlarges.

3. The behavior control method according to claim 2, wherein:
the possibility reduction behavior includes transfer of the vehicle toward a position where the area of the blind-spot region decreases.

4. The behavior control method according to claim 1, wherein:
the level of the jump-out possibility increases as a supposed moving speed assumed for the moving object increases.

5. The behavior control method according to claim 1, wherein:
contents of the possibility reduction behavior change depending on the level of the jump-out possibility.

6. The behavior control method according to claim 1, wherein:
the determining of the jump-out possibility determines that the jump-out possibility is in a low state in response to that the travel behavior is feasible without causing deceleration on the moving object assumed to be present in the blind-spot region; and
the performing of the travel behavior starts the travel behavior in response to determining that the jump-out possibility is in the low state.

7. The behavior control method according to claim 1, wherein:
the travel route includes at least one of a turn or a lane change.

8. The behavior control method according to claim 7, wherein:
the travel behavior compliant with the travel route includes the at least one of the turn or the lane change.

9. The behavior control method according to claim 1, wherein:
the determining of the jump-out possibility determines a possibility that the moving object from the blind-spot region intrudes the travel route from the blind-spot region.

10. The behavior control method according to claim 1, wherein:
the non-telecommunications notification behavior includes a headlight operation in which a low beam and a high beam are repeatedly alternated once or more, or in which the high beam is turned on once or more.

11. The behavior control method according to claim 1, wherein:
in response to the jump-out possibility being determined to be in the high state,
the telecommunications notification behavior is performed and the non-telecommunications notification behavior is not performed.

12. A behavior control apparatus controlling a behavior of a vehicle mounted with an environment recognition portion that recognizes a travel environment, the behavior control apparatus comprising:
a processor;
a non-transitory computer-readable storage medium; and
a set of computer-executable instructions stored on the non-transitory computer-readable storage medium that cause the processor to:
specify a blind-spot region as a blind spot for the environment recognition portion along a travel route for the vehicle configured to include at least one of a turn or a lane change, and determine a presence of a jump-out possibility of a moving object to the travel route from the blind-spot region; and
start a possibility reduction behavior before the vehicle performs a travel behavior compliant with the travel route, the jump-out possibility from the blind-spot region being lowered through the possibility reduction behavior, wherein:
the possibility reduction behavior includes a notification behavior notifying a surroundings of the vehicle of a start of the travel behavior by the vehicle;
the notification behavior includes
- a telecommunications notification behavior that notifies the surroundings of the vehicle, through wireless communication, of the start of the travel behavior by the vehicle; and
- a non-telecommunications notification behavior that notifies the surroundings of the vehicle, through at least one method different from the wireless communication, of the start of the travel behavior by the vehicle; and determining of the presence of the jump-out possibility includes determining of a level of the jump-out possibility;

determining of the level of the jump-out possibility comprises determining that the jump-out possibility is in a high state in response to determining that the moving object assumed to be present in the blind-spot region would be caused to decelerate in response to the vehicle performing the travel behavior; and in response to the jump-out possibility being determined to be in the high state, performing of the non-telecommunications notification behavior is not performed.

13. The behavior control apparatus according to claim 12, wherein:

the travel behavior compliant with the travel route includes the at least one of the turn or the lane change.

\* \* \* \* \*